United States Patent
Seidl et al.

(10) Patent No.: US 12,182,316 B2
(45) Date of Patent: Dec. 31, 2024

(54) INTEGRATED CIRCUIT PROTECTION AGAINST REVERSE ENGINEERING

(71) Applicant: Infineon Technologies AG, Neubiberg (DE)

(72) Inventors: Stefan Seidl, Munich (DE); Joel Hatsch, Holzkirchen (DE); Artur Wroblewski, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 141 days.

(21) Appl. No.: 18/153,578

(22) Filed: Jan. 12, 2023

(65) Prior Publication Data
US 2023/0244820 A1    Aug. 3, 2023

(30) Foreign Application Priority Data
Feb. 1, 2022    (DE) .......................... 102022102312.5

(51) Int. Cl.
*G06F 21/75* (2013.01)
*G06F 21/72* (2013.01)
(Continued)

(52) U.S. Cl.
CPC .............. *G06F 21/75* (2013.01); *G06F 21/72* (2013.01); *H03K 3/037* (2013.01); *H03K 19/003* (2013.01)

(58) Field of Classification Search
CPC ....... G06F 21/72; G06F 21/75; H03K 19/003; H03K 19/007; H03K 3/037; H03K 3/0375
See application file for complete search history.

(56) References Cited

U.S. PATENT DOCUMENTS 5,357,572 A * 10/1994 Bianco ........... G01R 31/318558
                                                    713/193
6,310,906 B1    10/2001 Abarbanel et al.
(Continued)

OTHER PUBLICATIONS

Sep. 9, 2022 (DE) Office Action—App. 102022102312.5.

*Primary Examiner* — Jason M Crawford
(74) *Attorney, Agent, or Firm* — Banner & Witcoff Ltd.

(57) ABSTRACT

A method for protecting an integrated circuit against reverse engineering including predefining a secret bit, forming a first clocked memory element having a first data input, a first data output and a first clock input in the integrated circuit, forming a second clocked memory element having a second data input, a second data output and a second clock input in the integrated circuit, forming a logic path in the integrated circuit and coupling the first data output to the second data input via the logic path and forming a clock signal line in the integrated circuit and coupling the first clock input to the second clock input via the clock signal line. The logic path and the clock signal line are formed such that their delays are such that, depending on a value of the secret bit, a logic level change of the first clocked memory element with a clock edge of a clock signal on the clock signal line affects a logic level output by the second clocked memory element with the same clock edge of the clock signal, or a logic level change of the first clocked memory element with a clock edge of a clock signal on the clock signal line affects a logic level output by second clocked memory element with any clock edge coming after the next clock edge of the clock signal.

8 Claims, 8 Drawing Sheets

(51) Int. Cl.
*H03K 3/037* (2006.01)
*H03K 19/003* (2006.01)

(56) References Cited

U.S. PATENT DOCUMENTS

| | | | |
|---|---|---|---|
| 11,797,714 B2* | 10/2023 | Weiner | G06F 21/755 |
| 2009/0292907 A1 | 11/2009 | Schwinn et al. | |
| 2020/0285719 A1* | 9/2020 | Wang | G11C 29/32 |
| 2021/0192089 A1* | 6/2021 | Weiner | G06F 9/542 |
| 2022/0188387 A1* | 6/2022 | Bhunia | G06F 21/121 |
| 2023/0116607 A1* | 4/2023 | Talukdar | G11C 29/36 |
| | | | 726/34 |
| 2023/0153472 A1* | 5/2023 | Seidl | G06F 21/755 |
| | | | 713/194 |
| 2023/0244820 A1* | 8/2023 | Seidl | G06F 21/72 |
| | | | 326/8 |

* cited by examiner

INTEGRATED CIRCUIT PROTECTION AGAINST REVERSE ENGINEERING

TECHNICAL FIELD

The present disclosure relates to integrated circuits and methods for protecting an integrated circuit against reverse engineering.

BACKGROUND

Reverse engineering (RE) of integrated circuits (IC) can be considered one of the biggest threats to the semiconductor industry because it can be used by an attacker to steal and/or hijack a circuit design. An attacker who successfully reverse engineers an integrated circuit can manufacture and sell a similar, i.e., cloned, integrated circuit and can illegally sell and publish the chip design, revealing, for example, a competitor's trade secrets.

Technical countermeasures against revere engineering of a chip include placing secrets on the chip and configuring the chip such that it cannot perform its task without the exact knowledge of those secret bits. Such secrets can be manifold. Starting with simple tie cells at the lowest security level non-volatile memory (NVM) content and finally specially designed camouflage cells on the highest level.

While these countermeasures provide effective protection against reverse engineering, the necessary logic cells are large and therefore expensive in terms of area. The large size is necessary to ensure a stable operation. This effect will even increase with smaller technologies. Further, stability of the cells cannot be assured by automated design flows and relies on analog simulations based on transistor models. In combination with the large area, they are noticeable among the other logic gates on the chip and thus may attract the interest of an attacker.

Accordingly, countermeasures against reverse engineering which are stable, difficult to reverse engineer and not clearly identifiable on a chip are desirable.

SUMMARY

According to various embodiments, a method for protecting an integrated circuit against reverse engineering is provided including predefining a secret bit, forming a first clocked memory element (e.g. a latch or a flip-flop) having a first data input, a first data output and a first clock input in the integrated circuit, forming a second clocked memory element having a second data input, a second data output and a second clock input in the integrated circuit, forming a logic path in the integrated circuit and coupling the first data output to the second data input via the logic path and forming a clock signal line in the integrated circuit and coupling the first clock input to the second clock input via the clock signal line. The logic path and the clock signal line are formed such that their delays are such that, depending on the value of the secret bit, a logic level change of the first memory element with a clock edge of a clock signal (i.e. a rising edge or a falling edge of the clock (e.g. square) clock signal) on the clock signal line affects the logic level output by the second memory element with the same clock edge of the clock signal or a logic level change of the first memory element with a clock edge of a clock signal on the clock signal line affects the logic level output by second memory element with any clock edge coming after the next clock edge of the clock signal.

According to a further embodiment, an integrated circuit is provided including a first clocked memory element having a first data input, a first data output and a first clock input, a second clocked memory element having a second data input, a second data output and a second clock input, a logic path coupling the first data output to the second data input and a clock signal line coupling the first clock input to the second clock input. The delays of the logic path and the clock signal line are such that a logic level change of the first memory element with a clock edge of a clock signal on the clock signal line affects the logic level output by the second memory element with the same clock edge of the clock signal or a logic level change of the first memory element with a clock edge of a clock signal on the clock signal line affects the logic level output by second memory element with any clock edge coming after the next clock edge of the clock signal.

The integrated circuit further includes a secret bit generation circuit configured to output a secret bit whose value depends on whether a logic level change of the first memory element with a clock edge of a clock signal on the clock signal line affects the logic level output by the second memory element with the same clock edge of the clock signal or a logic level change of the first memory element with a clock edge of a clock signal on the clock signal line affects the logic level output by second memory element with any clock edge coming after the next clock edge of the clock signal.

Further, the integrated circuit includes a processing circuit configured to at least one of check whether the value of the secret bit is correct and, if the value of the secret bit is not correct, signal an alarm and use the secret bit as a bit of cryptographic key and perform a cryptographic operation using the cryptographic key.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the disclosure. In the following description, various aspects are described with reference to the following drawings, in which.

DETAILED DESCRIPTION

The following detailed description refers to the accompanying drawings that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

Figure 1:
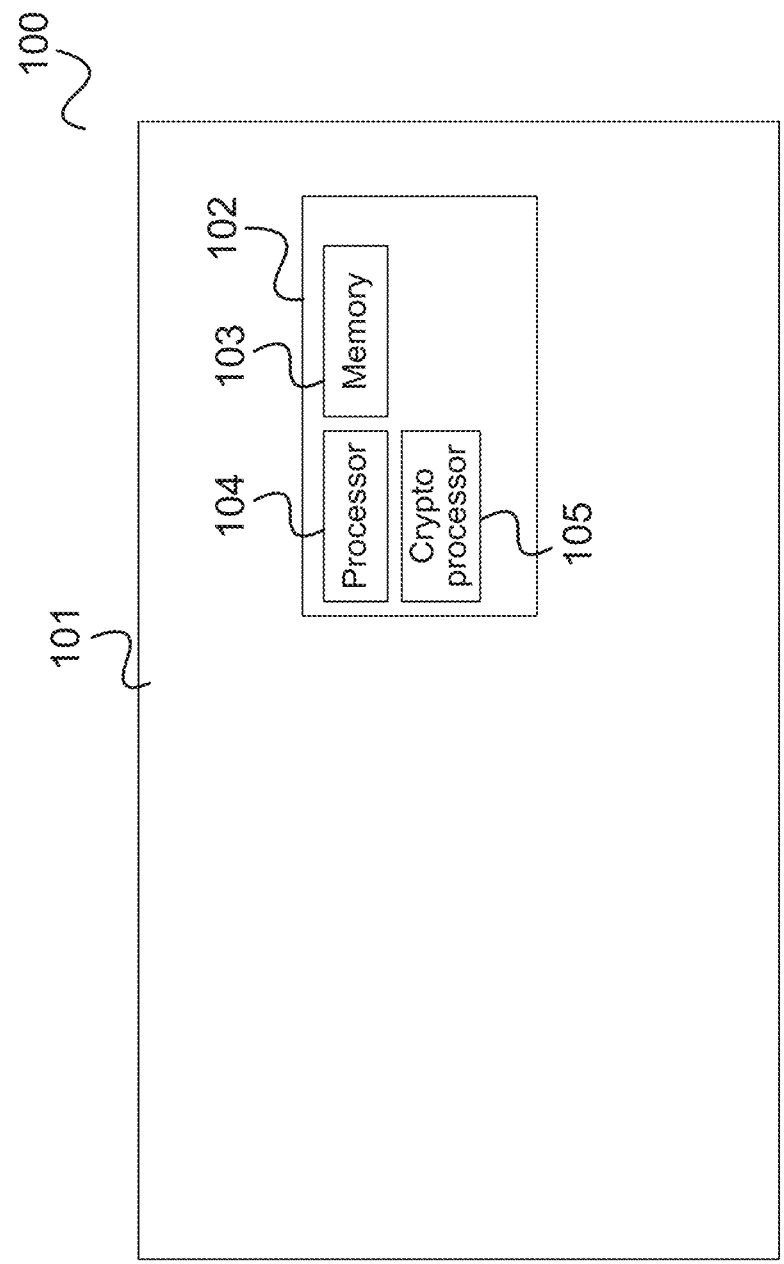
FIG. 1 shows a smart card according to one embodiment.

FIG. 1 shows a smart card 100 according to one embodiment.

The smart card 100 includes a carrier 101 on which a smart card module 102 is arranged. The smart card module 102 includes various data processing components, such as a memory 103, a processor 104 or, for example, a dedicated crypto processor 105.

For example, the smart card module 102 is intended to be hardened against reverse engineering (or extraction of secret content). However, this is only intended to serve as an example and chips in many different application areas can be protected against reverse engineering (or extracting of secret content) according to embodiment examples, e.g. microcontroller chips, e.g. in control devices such as in a vehicle, e.g. in an ECU (electronic control unit), for smart cards of any form factor, communication chips, control chips of various devices such as printers, etc.

To protect against reverse engineering, secret-carrying circuits may be provided on a chip, i.e., circuits that output one or more secret bits and that are camouflaged and/or whose secret is very difficult to determine by reverse engineering because it is based, for example, on small performance differences.

However, such secret-carrying circuits require additional area on the chip and may be noticeable.

Therefore, according to various embodiments, rather than storing a secret (i.e. secret information, i.e. one or more secret bits) in a dedicated complex logic cell, secrets are represented by elements that can be found at any other place in the design (e.g. elements from a default set of the standard cell library used for designing the chip). Specifically, according to various embodiments, the secret is not defined by the physical properties of a cell. Instead, it is hidden in the timing relations between the elements of the chip.

It should be noted that an attacker (reverse engineer) typically generates a net list of the chip to be reverse-engineered. However, by hiding a secret in the timing relations, the secret is not represented by the net list. It is purely created by the timing between the elements of the net list.

Time sensitive elements that may be used for hiding a secret include latches and registers. The following examples focus on registers (i.e. D type flip-flops), as they are typically more often implemented in chip products than latches, but the approaches described in the following may also be used using latches.

Figure 2:
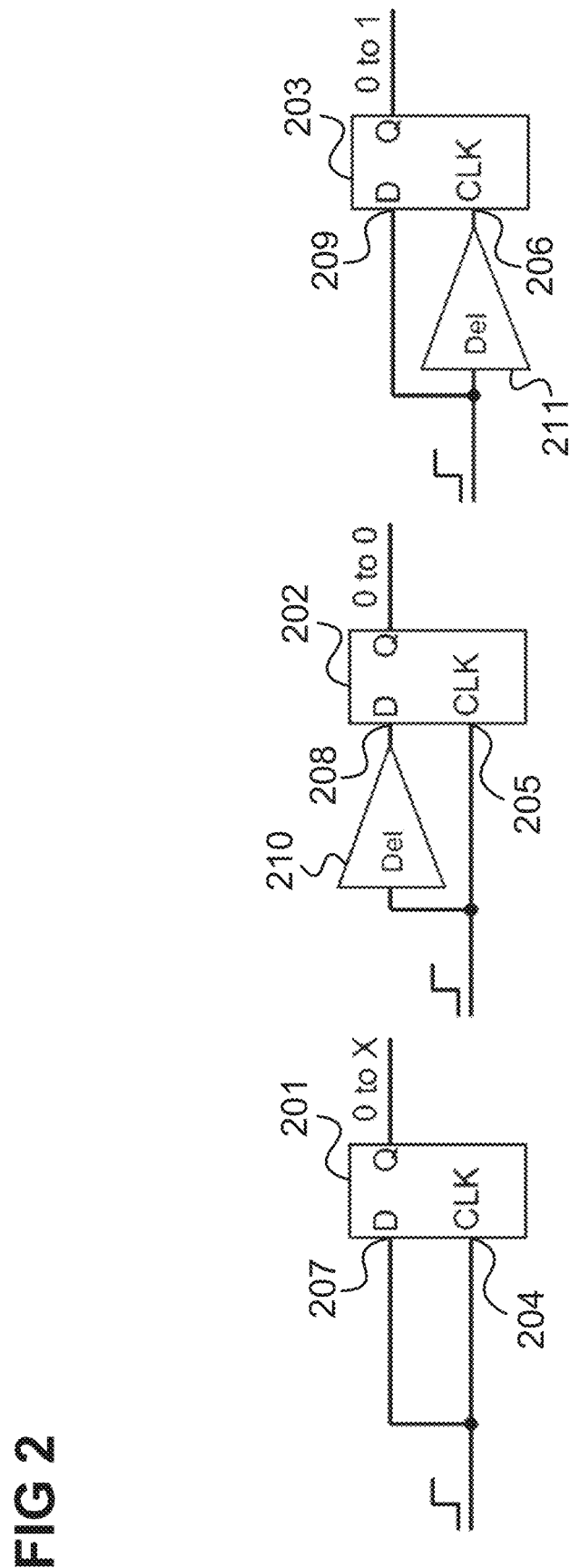
FIG. 2 illustrates three registers in different configurations for illustrating the dependence of the registers' output from timing.

FIG. 2 illustrates three registers 201, 202, 203 in different configurations for illustrating the dependence of the registers' output from timing.

It is assumed that initially, the logic state of the registers 201, 202, 203 is set to 0, for example by an external reset.

Each register 201, 202, 203 has a respective data input 204, 205, 206 and a respective clock input 207, 208, 209.

Each register 201, 202, 203 is sensitive to a rising edge signal at its clock input 207, 208, 209. It should be noted that rising edge is only an example and the registers may also be sensitive to falling edges (e.g. they switch in response to falling edges rather than rising edges). In the example of FIG. 2, the signal having the rising edge is sent both to the data input 204, 205, 206 and the clock input 207, 208, 209 but with different timings.

Specifically, in the first register 201, the rising edge reaches the two inputs 204, 207 simultaneously. The corresponding output of the first register 201 is not defined and depends on noise, process variations of the register's transistors and so on.

In case of the second register 202 the rising edge is delayed (by a data input delay 210) on its way to the register's data input 208. This leads to no transition at the register's output, as the latching process (triggered by the edge at the clock input 205) has already finished when the edge is reaching the data input 208. Thus, as long as a sufficient data input delay 210 is guaranteed, this configuration leads to a well-defined output.

In case of the third register 203, the edge is delayed on its way to the register's clock input 206 by a clock input delay 211. This leads to a transition from 0 to 1 at the output. As long as a sufficient clock input delay 211 is guaranteed, this configuration leads to a well-defined output.

Both configurations of the second register 202 and the second register 203 may be used for encoding secret bits in an integrated circuit by suitable selection of the delays 210, 211.

While in the examples of FIG. 2 the timings and their effects are easy to see, situation becomes a lot more difficult to analyze in a complex environment.

Figure 3:
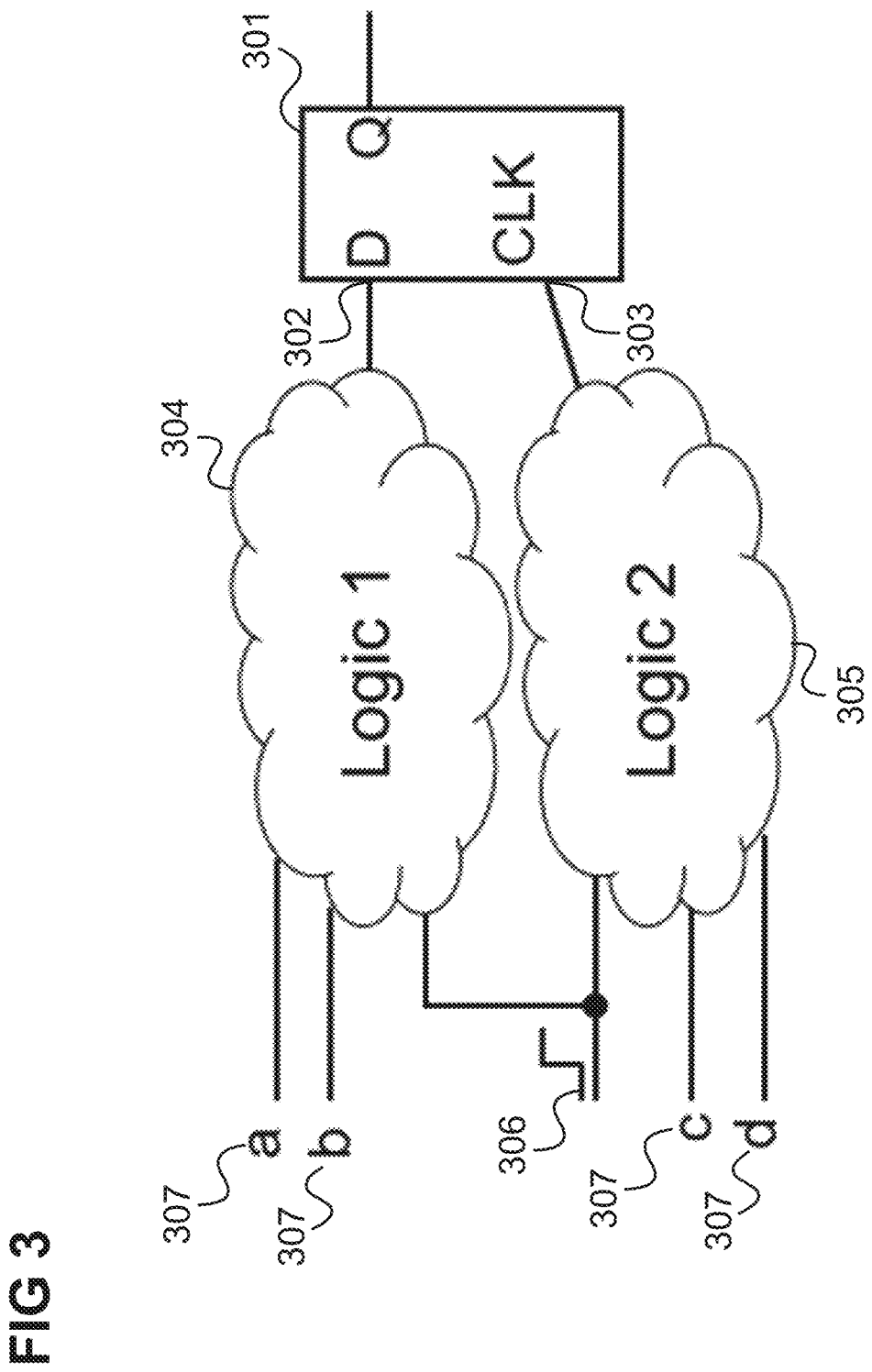
FIG. 3 illustrates a register in a general configuration.

FIG. 3 illustrates a register 301 in a general configuration. In front of the register's data input 302 and clock input 303 are a first logic circuit (logic cloud) 304 and a second logic circuit (logic cloud) 305, respectively. A rising edge 306 going into both logic clouds 304, 305 triggers a transition on the data input 302 and the clock input 303. Now, as explained with reference to FIG. 2, it depends on the relative delay of the two logic clouds 304, 305 whether a transition on the register's output will happen or not. When additional signals 307 go into the logic clouds 304, 305, the result can depend on these signals 307.

A reverse engineer knowing only the net list of the logic clouds 304, 305 is unable to predict the right output. Without knowing the exact timing resulting from the delays of the logic clouds' cells and the logic cells' circuit parasitics, the main attacker does not have the necessary information for determining whether the clock edge 306 leads to a transition at the register's output or not.

Figure 4:
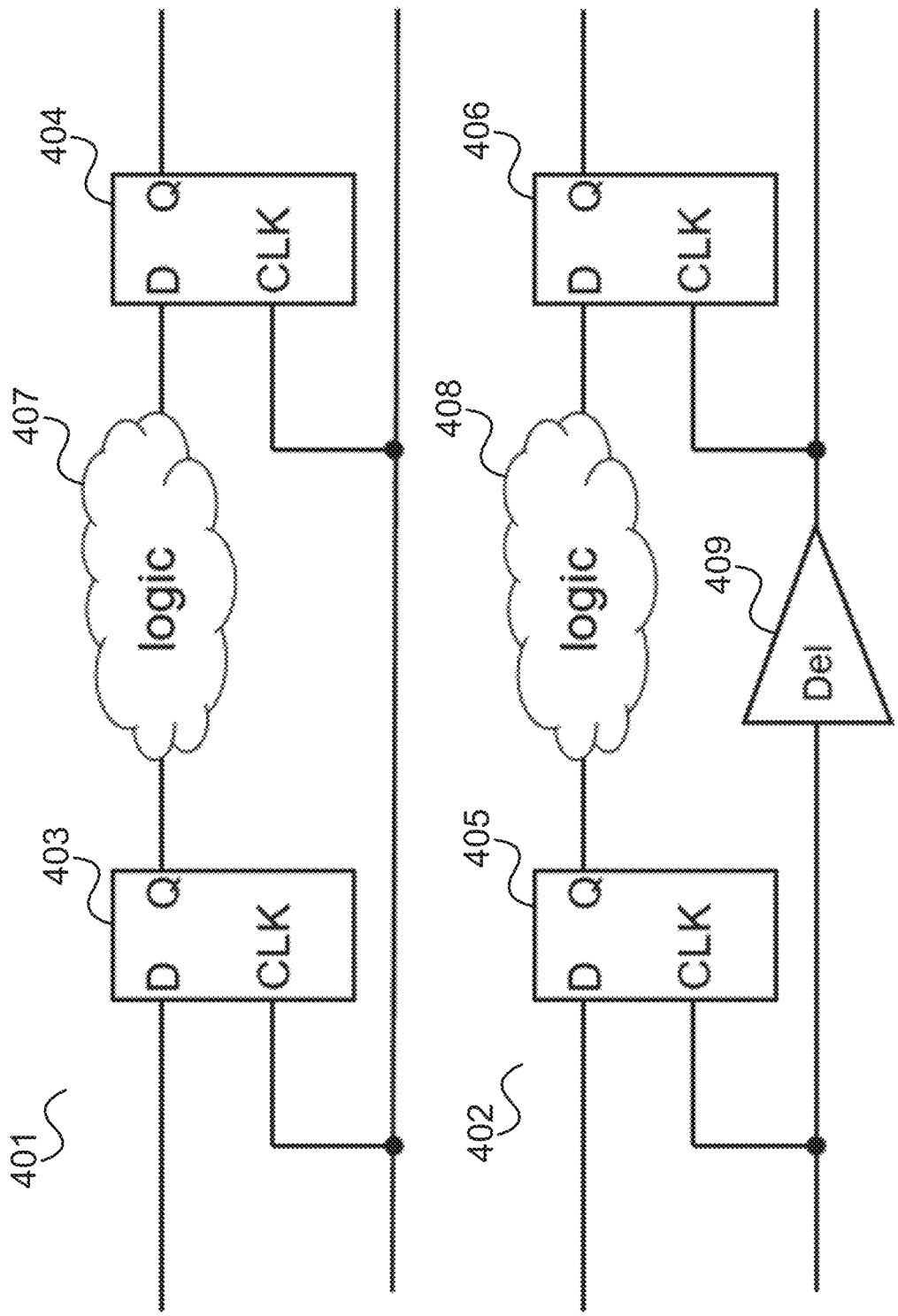
FIG. 4 shows two circuits wherein, in each case, a respective first register and a respective second register are connected in series by connecting the first register's output with the second register's data input.

FIG. 4 shows two circuits 401, 402 wherein, in each case, a respective first register 403, 405 and a respective second register 404, 406 are connected in series by connecting the first register's output with the second register's data input via a respective logic circuit (logic cloud) 407, 408.

In the first circuit 401, information is passed on by each clock cycle from the first register 403 to the second register 404. The first circuit 401 (as well as the second circuit 402) may for example be fragment of a Linear Feedback Shift Register (LFSR) as a simple example.

In the second circuit 402, the clock signal is delayed by a clock signal line delay 409 between the clock input of the first register 405 and the clock input of the second register 406 by a clock delay 209. If the clock delay 209 is sufficiently high, an output (changed in response to a rising edge at the first register's clock input and a change at the first registers data input) of the first register 205 is propagated through the logic cloud 208 to the second register's data input and is written into the second register 406 when the rising edge arrives at the second register's clock input. In this case, the second register 406 can be seen to be dispensable as it is not stopping the information flow (i.e. not delaying the information flow by one clock cycle as it is the case in the first circuit 401). In particular, in an LFSR this construction would reduce the effective length by one. However, from a reverse engineering countermeasure point of view, its importance lies in that a reverse engineer assuming a correctly working system (like in the first circuit 401 where the second register 406 is not dispensable) would come up with the wrong result since the attacker would assume that the changed output of the first register 405 would only lead to a logic level change of the second register 406 with the next rising edge rather than with the same rising clock edge (that caused the logic level change of the first register 405).

In FIGS. 2 and 4, the delays 210, 211, 409 are drawn as delay buffers. However, in practical application, the delays 210, 211, 409 may be implemented in various ways. For example, a modified clock gate, different parts of a clock tree or simply a long connection in combination with a weak driver can be used for implementing delays between clock inputs. As explained above, delays of a data input signal may be achieved by an intermediate logic circuit 407, 408 which may be modified to achieve a desired delay.

In the example of the second circuit 402 of FIG. 4, the reverse engineer countermeasure is based on a (sufficiently high) delay of the clock signal. However, a delay of the data signal can also be used.

Figure 5:
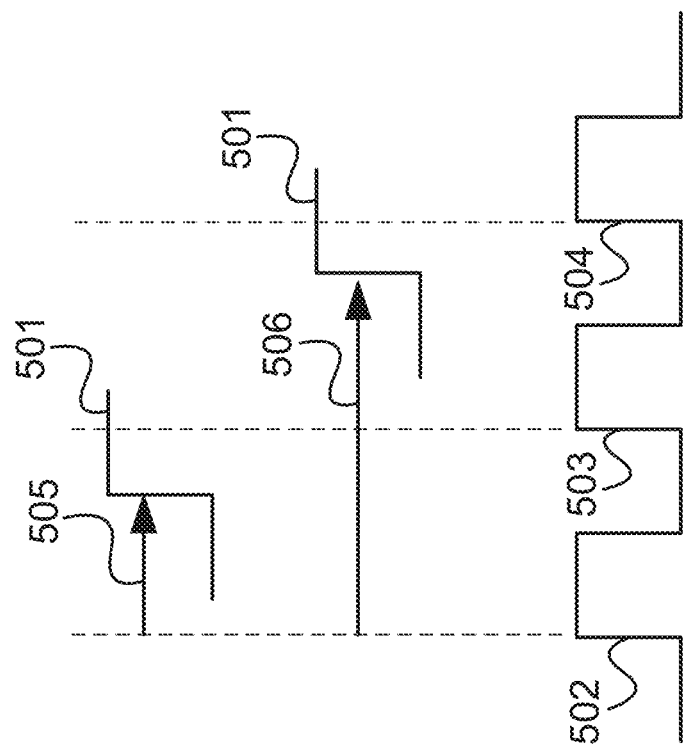
FIG. 5 illustrates a delay of a data signal.

FIG. 5 illustrates a delay of a data signal.

For example, by having a small clock delay 409 and a high delay 506 of the logic cloud 408, a changed output (here a rising edge 501 that is caused by a logic level state change of the first register 405 with a first clock edge 502) may only be registered with a third clock edge 504 (which is the clock edge after the next) or with a clock edge after that. Without the high delay, i.e. with only a small delay 505 according to usual design rules, the rising edge 501 would be registered with the next clock edge 503.

The rising edge is output by the and which is output with a slight delay with respect to the first clock edge 502.

Thus, rather than a single clock edge three clock edges have to be considered.

It should further be noted that multiple first registers 405 may be included in a circuit that provide outputs to multiple second registers 406, wherein the logic cloud 408 may be shared among multiple pairs of first register and second register, i.e. there may be shared logic cloud between the outputs of a set of (one or more) first registers 405 and a set of (one or more) second registers 406.

Figure 6:
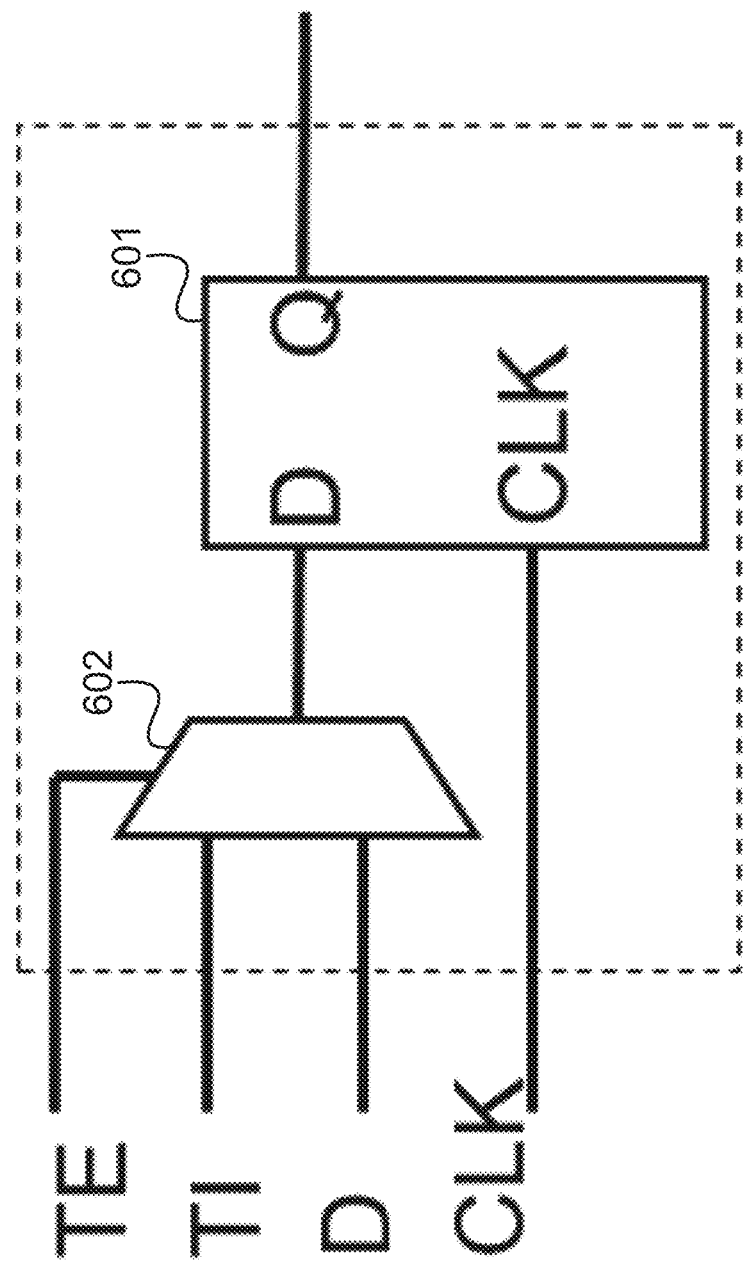
FIG. 6 illustrates usage of a scan input to trigger the output of a secret.

FIG. 6 illustrates usage of a scan input to trigger the output of a secret.

Often, a register 601 in a chip possesses additional TE (test enable) and TI (test input) inputs. Those are only used for the test scan before the chip is sold. As soon as the chip is out in the field the entire scan logic is typically no longer used (i.e. the scan logic is "dead circuitry").

As the scan logic does therefore not contribute anything to the operational logic that a cloner wants to copy, the chances are high that the attacker will not analyze it to the last detail. Therefore, it may be beneficial to reuse parts of it for implementing the generation of timing dependent secrets as explained above.

With this approach the register 601 would be implanted for normal operation in the usual way. But while they are not used during operation a TE signal, e.g. controlling a multiplexer 602 at the register's data input, could switch the input TI active and the secret generation can be performed via the timing difference between TI and the clock signal CLK that the register 601 receives at its clock input (wherein TI may come from another register).

Figure 7:
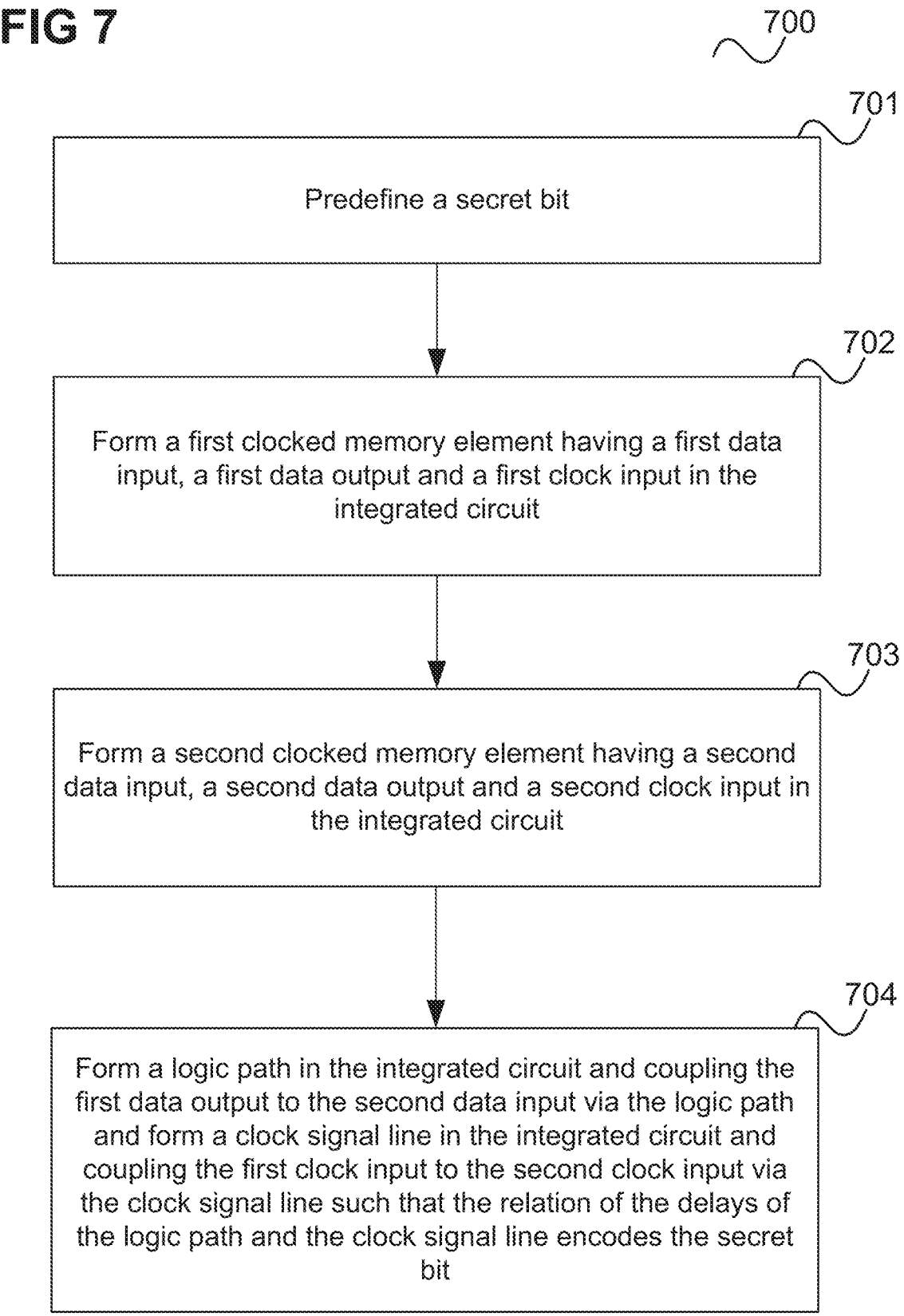
FIG. 7 shows a flow diagram illustrating a method for protecting an integrated circuit against reverse engineering.

In summary, according to various embodiments, a method is provided as illustrated in FIG. 7.

FIG. 7 shows a flow diagram 700 illustrating a method for protecting an integrated circuit against reverse engineering.

In 701, a secret bit is predefined.

In 702, a first clocked memory element having a first data input, a first data output and a first clock input is formed in the integrated circuit.

In 703, a second clocked memory element having a second data input, a second data output and a second clock input is formed in the integrated circuit.

In 704, a logic path (e.g. a path comprising at least one logic gate) is formed in the integrated circuit and the first data output is coupled to the second data input via the logic path and a clock signal line is formed in the integrated circuit the first clock input is coupled to the second clock input via the clock signal line.

The logic path and the clock signal line are formed such that their delays are such that, depending on the value of the secret bit, a logic level change of the first memory element with a clock edge of a clock signal on the clock signal line affects the logic level output by the second memory element (e.g. sets the logic level of the second memory element or leads to a logic level change of the second memory element) with the same clock edge of the clock signal or a logic level change of the first memory element with a clock edge of a clock signal on the clock signal line affects the logic level output by second memory element (e.g. sets the logic level of the second memory element or leads to a logic level change of the second memory element) with any clock edge coming after the next clock edge of the clock signal.

According to various embodiments, in other words a secret bit is hidden in a chip in the timing relation between to clocked memory elements (e.g. registers, latches, flip-flops etc.). More specifically, the secret bit can be seen to be hidden by a timing violation since the expected behavior is typically that a logic level change occurring in a clocked memory element (first clocked memory element in FIG. 5) with a certain clock edge is propagated to the subsequent clocked memory element (second clocked memory element in FIG. 5) in the next clock edge rather than the same clock edge or any clock edge coming after the next (i.e. after two or more clock cycles) as it is the case according to the approach of FIG. 5. For example, if the secret bit is 0, the logic level change is propagated with the same clock edge and if the secret bit is 1, the logic level change is propagated with the clock edge after the next (or vice versa) or even later.

The approach of FIG. 5 can thus be seen to abandon the usual digital design principles for working circuitry to hide secret bits on a chip. A whole set of bits may be hidden in this manner, e.g. a cryptographic key having 128 or 256 bits.

An attacker, in order to clone the chip needs therefore to copy the gates as well as the timing. A timing sequence that is different to the expected one is extremely hard to detect for a cloner. Typically, there are millions off possible paths on a chip, where secret bits may be hidden in this manner.

An attacker thus would need to start guessing where a violation could occur taking into account every path of the design. The chip designer, on the other hand, can control the timing by consulting the timing information about the gates (usually available in the chip cell library documentation) and using corresponding chip design tools.

Instead of a camouflage cell, a secret hidden in the timing is not eye-catching. Further, memory elements already existing in the design can be used for hiding the secret bits so there is little additional area demand for the reverse engineering countermeasure.

Hiding secrets in the scan logic (as explained with reference to FIG. 5) may further reduce the risk of detection.

It should be noted that the chip manufacturing operations 701 to 704 do not necessarily have to be performed in the order shown in FIG. 7 but may be performed in any other order or in parallel.

Figure 8:
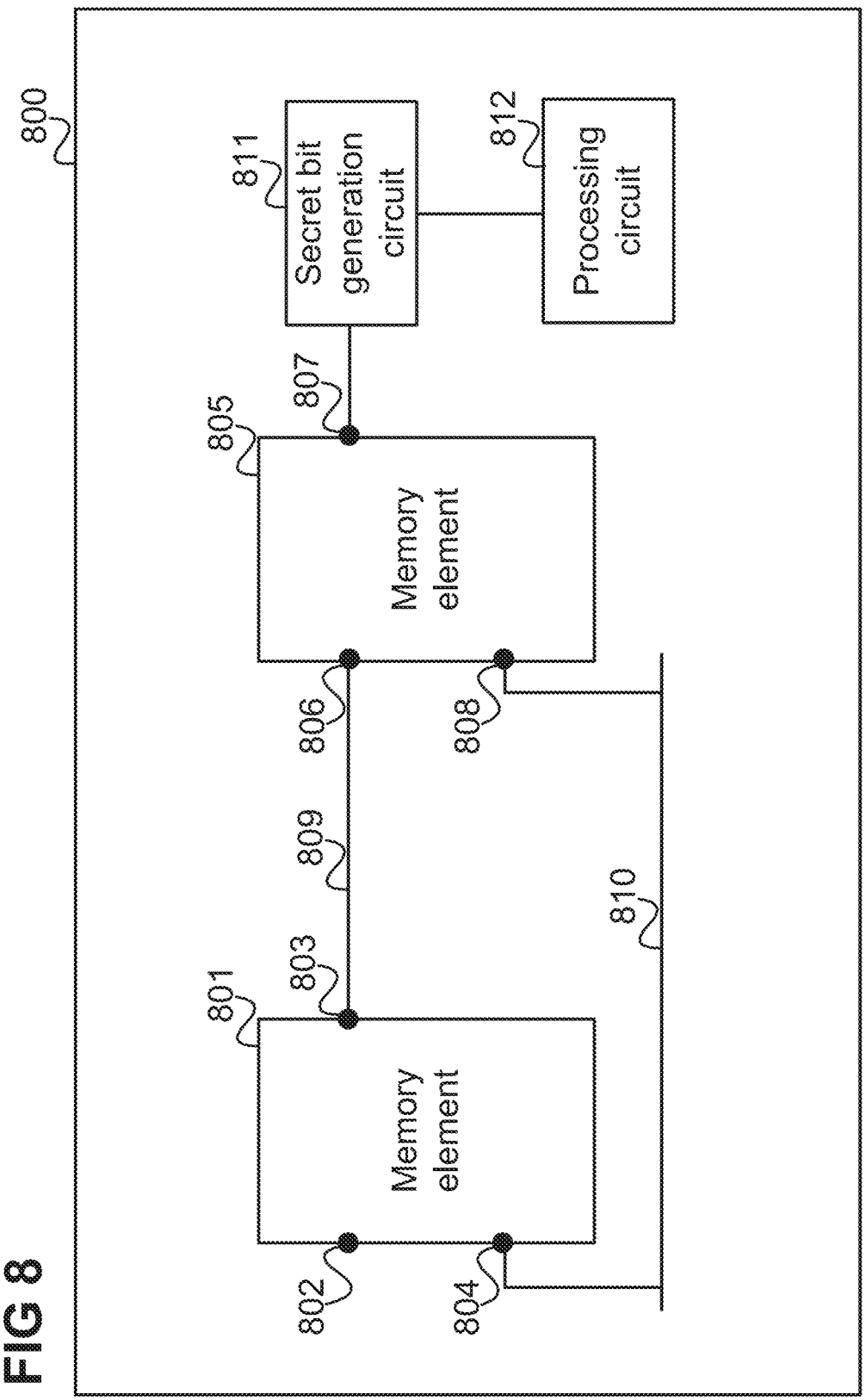
FIG. 8 shows an integrated circuit according to an embodiment.

FIG. 8 shows an integrated circuit (i.e. a chip) 800 according to an embodiment.

The integrated circuit 800 includes a first clocked memory element 801 having a first data input 802, a first data output 803 and a first clock input 804 and a second clocked memory element 805 having a second data input 806 a second data output 807 and a second clock input 808.

The integrated circuit 800 further a logic path 809 coupling the first data output 803 to the second data input 806 and a clock signal line 810 coupling the first clock input 804 to the second clock input 808.

The delays of the logic path 809 and the clock signal line 810 are such that
a logic level change of the first memory element 801 with a clock edge of a clock signal on the clock signal line affects the logic level output by the second memory element 805 with the same clock edge of the clock signal
or
a logic level change of the first memory element 801 with a clock edge of a clock signal on the clock signal line affects the logic level output by second memory element 805 with any clock edge coming after the next clock edge of the clock signal.

The integrated circuit 800 further includes a secret bit generation circuit 811 configured to output a secret bit whose value depends on whether
a logic level change of the first memory element 801 with a clock edge of a clock signal on the clock signal line affects the logic level output by the second memory element 805 with the same clock edge of the clock signal
or
a logic level change of the first memory element 801 with a clock edge of a clock signal on the clock signal line affects the logic level output by second memory element 805 with any clock edge coming after the next clock edge of the clock signal.

Further, the integrated circuit includes a processing circuit 812 configured to at least one of
check whether the value of the secret bit is correct and, if the value of the secret bit is not correct, signal an alarm (and, e.g. switch the integrated circuit 800 to an alarm state)
and
use the secret bit as a bit of cryptographic key and perform a cryptographic operation using the cryptographic key.

The integrated circuit may for example comprise a control circuit that triggers the generation for a certain clock edge (i.e. such that the logic level change occurs at a certain clock edge). The secret bit generation circuit may then detect when the logic level change affects the logic level output by the second memory element (e.g. when it changes the logic level of the second memory element, possibly in combination with other logic and signals between the first memory element and the second memory element). It may then for example be configured to output a 1 when it arrives with the same clock edge and a 0 else, i.e. later (namely in case that the configuration of the (original) integrated circuit is such that it arrives with the same clock edge). Alternatively, it may be configured to output a 1 when it arrives with the clock edge after the next and a 0 else, i.e. earlier (namely in case that the configuration of the (original) integrated circuit is that it arrives with the clock edge after the next).

Thus, in a cloned chip where the timing violation has not been copied by the reverse engineer, the secret bit generation circuit would put out a zero while, for example, a 1 would be expected for the integrated circuit to properly function.

The values of 1 and 0 may here be interchanged of course, i.e. they can generally be referred to as a first predetermined bit value and a second predetermined bit value (different from each other).

It should be noted that the alarm state may be a locked state of the integrated circuit (i.e. chip) but may also include a processing with fake data such that an attacker does (at least not immediately) realize that the integrated circuit does not function properly.

Various Examples are described in the following:

Example 1 is a method for protecting an integrated circuit against reverse engineering as described with reference to FIG. 7.

Example 2 is the method of Example 1, comprising setting the delay of the clock signal line by including a logic gate into the clock signal line.

Example 3 is the method of Example 1, wherein the logic gate is a delay buffer.

Example 4 is the method of any one of Examples 1 to 3, comprising forming a data processing path comprising the first clocked memory element and the second clocked memory element.

Example 5 is the method of Example 4, comprising forming a linear shift register comprising the processing path and comprising the first clocked memory element and the second clocked memory element as memory elements.

Example 6 is the method of any one of Examples 1 to 5, wherein the first memory element and the second memory element are flip-flops or latches.

Example 7 is the method of any one of Examples 1 to 6, wherein the first memory element and the second memory element are D type flip-flops.

Example 8 is a method for protecting an integrated circuit against reverse engineering, comprising predefining a secret having multiple bits and, for each bit of the secret, predefining a respective secret bit according to the bit of the secret key by forming a respective first clocked memory element, a respective second clocked memory element, a respective logic path and a respective clock signal line according to any one of Examples 1 to 6.

Example 9 is the method of Example 8, wherein the secret is a cryptographic key and the method comprises forming a processing circuit in the integrated circuit configured to perform a cryptographic processing using the cryptographic key.

Example 10 is an integrated circuit as described with reference to FIG. 8.

Example 11 is the integrated circuit of Example 10, wherein checking whether the value of the secret bit is correct comprises using the secret bit for an operation and checking whether the result of the operation is correct.

Example 12 is the integrated circuit of Example 10, wherein checking whether the value of the secret bit is correct comprises comparing the secret bit with a reference bit.

Example 13 is the integrated circuit of any one of Examples 10 to 12, comprising a control circuit configured to initiate the generation of the secret bit by supplying a data signal triggering the logic level change of the first memory element to the first memory element.

Example 14 is the integrated circuit of any one of Examples 10 to 13, comprising a test input, wherein the control circuit is configured to initiate the generation of the secret bit by supplying the data signal to the first memory element via the test input.

Example 15 is the integrated circuit of any one of Examples 10 to 14, wherein the secret bit generation circuit is configured such that the value of the secret bit that it outputs
- is equal to a first predetermined bit value if a logic level change of the first memory element with a clock edge of a clock signal on the clock signal line affects the logic level output by the second memory element with the same clock edge of the clock signal and
- is equal to a second predetermined bit value different from the first predetermined bit value else if a logic level change of the first memory element with a clock edge of a clock signal on the clock signal line does not affect the logic level output by the second memory element with the same clock edge of the clock signal.

Example 16 is the integrated circuit of any one of Examples 10 to 14, wherein the secret bit generation circuit is configured such that the value of the secret bit that it outputs
- is equal to a first predetermined bit value if a logic level change of the first memory element with a clock edge of a clock signal on the clock signal line affects the logic level output by second memory element with a clock edge coming after the next clock edge of the clock signal and
- is equal to a second predetermined bit value different from the first predetermined bit value else if a logic level change of the first memory element with a clock edge of a clock signal on the clock signal line does not affect the logic level change of the second memory element with the clock edge coming after the next clock edge of the clock signal.

Example 17 is an integrated circuit comprising a plurality of sub-circuits, each sub-circuit comprising a respective first clocked memory element, a respective second clocked memory element, a respective logic path and a respective clock signal line and a respective secret bit generation circuit according to the integrated circuit of any one of Examples 10 to 14, and comprising a processing circuit configured to at least one of
- check whether the value of the secret bits are correct and, if the value of the secret bit are not correct, signal an alarm and
- form a cryptographic key from the secret bits and perform a cryptographic operation using the cryptographic key.

It should be noted that embodiments described in context with the method are analogously valid for the integrated circuit and vice versa. In particular, the method may include operations corresponding to the functionalities of the secret bit generation circuit, the processing circuit and/or the control circuit.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

REFERENCE SIGNS

100 Smart card
101 Smart card carrier
102 Smart card module
103 Memory
104 Processor
105 Crypto processor
201-203 Registers
204-206 Data inputs
207-209 Clock inputs
210 Data input delay
211 Clock input delay
301 Register
302 Data input
303 Clock input
304, 305 Logic circuits
306 Rising edge
307 Additional signals
401, 402 Circuits
403-406 Registers
407, 408 Logic circuits
409 Clock signal line delay
501 Rising edge
502-504 Clock edges
505 Small delay
506 High delay
601 Register
602 Multiplexer
700 Flow diagram
701-704 Chip processing operations
800 Chip
801 Clocked memory element
802 Data input
803 Data output
804 Clock input
805 Clocked memory element
806 Data input
807 Data output
808 Clock input
809 Logic path
810 Clock signal line
811 Secret bit generation circuit
812 Processing circuit

What is claimed is:

1. An integrated circuit, comprising:
a first clocked memory element having a first data input, a first data output and a first clock input;
a second clocked memory element having a second data input, a second data output and a second clock input;
a logic path coupling the first data output to the second data input;
a clock signal line coupling the first clock input to the second clock input;
wherein delays of the logic path and the clock signal line are such that
a logic level change of the first clocked memory element with a clock edge of a clock signal on the clock signal line affects the logic level output by the second clocked memory element with the same clock edge of the clock signal,
or a logic level change of the first clocked memory element with a clock edge of a clock signal on the clock signal line affects the logic level output by second clocked memory element with any clock edge coming after the next clock edge of the clock signal;

a secret bit generation circuit configured to output a secret bit whose value depends on whether a logic level change of the first clocked memory element with a clock edge of a clock signal on the clock signal line affects the logic level output by the second clocked memory element with the same clock edge of the clock signal, or a logic level change of the first clocked memory element with a clock edge of a clock signal on the clock signal line affects the logic level output by second clocked memory element with any clock edge coming after the next clock edge of the clock signal; and a processing circuit configured to at least one of check whether the value of the secret bit is correct and, if the value of the secret bit is not correct, signal an alarm, and use the secret bit as a bit of cryptographic key and perform a cryptographic operation using the cryptographic key.

2. The integrated circuit of claim 1, wherein checking whether the value of the secret bit is correct comprises using the secret bit for an operation and checking whether a result of the operation is correct.

3. The integrated circuit of claim 1, wherein checking whether the value of the secret bit is correct comprises comparing the secret bit with a reference bit.

4. The integrated circuit of claim 1, comprising a control circuit configured to initiate a generation of the secret bit by supplying a data signal triggering the logic level change of the first clocked memory element to the first clocked memory element.

5. The integrated circuit of claim 4, comprising a test input, wherein the control circuit is configured to initiate the generation of the secret bit by supplying the data signal to the first clocked memory element via the test input.

6. The integrated circuit of claim 1, wherein the secret bit generation circuit is configured such that the value of the secret bit that it outputs is equal to a first predetermined bit value if a logic level change of the first clocked memory element with a clock edge of a clock signal on the clock signal line affects the logic level output by the second clocked memory element with the same clock edge of the clock signal, and is equal to a second predetermined bit value different from the first predetermined bit value else if a logic level change of the first clocked memory element with a clock edge of a clock signal on the clock signal line does not affect the logic level output by the second clocked memory element with the same clock edge of the clock signal.

7. The integrated circuit of claim 1, wherein the secret bit generation circuit is configured such that the value of the secret bit that it outputs is equal to a first predetermined bit value if a logic level change of the first clocked memory element with a clock edge of a clock signal on the clock signal line affects the logic level output by the second clocked memory element with a clock edge coming after the next clock edge of the clock signal and is equal to a second predetermined bit value different from the first predetermined bit value else if a logic level change of the first clocked memory element with a clock edge of a clock signal on the clock signal line does not affect the logic level change of the second clocked memory element with the clock edge coming after the next clock edge of the clock signal.

8. An integrated circuit comprising a plurality of sub-circuits, each sub-circuit comprising a respective first clocked memory element, a respective second clocked memory element, a respective logic path and a respective clock signal line and a respective secret bit generation circuit according to the integrated circuit of claim 1, and comprising a processing circuit configured to at least one of check whether the value of the secret bits are correct and, if the value of the secret bit are not correct, signal an alarm, and form a cryptographic key from the secret bits and perform a cryptographic operation using the cryptographic key.

* * * * *